United States Patent [19]

Smith et al.

[11] 4,233,709
[45] Nov. 18, 1980

[54] LINK CUTTER

[75] Inventors: David W. Smith, West Des Moines; Mark W. Paar, Des Moines, both of Iowa

[73] Assignee: Townsend Engineering Company, Des Moines, Iowa

[21] Appl. No.: 46,119

[22] Filed: Jun. 6, 1979

[51] Int. Cl.³ .............................................. A22C 11/00
[52] U.S. Cl. ........................................ 17/1 F; 17/33; 17/34
[58] Field of Search ........................ 17/1 F, 33, 34, 49

[56] References Cited

U.S. PATENT DOCUMENTS

| | | | |
|---|---|---|---|
| 1,459,063 | 6/1923 | Kruse | 17/34 |
| 3,964,129 | 6/1976 | Townsend | 17/34 X |
| 4,073,039 | 2/1978 | Müller | 17/1 F |
| 4,091,505 | 5/1978 | Müller | 17/1 F |

*Primary Examiner*—Willie G. Abercrombie
*Attorney, Agent, or Firm*—Zarley, McKee, Thomte, Voorhees & Sease

[57] ABSTRACT

A link cutter apparatus for separating stuffed product casing links interconnected by twisted casing sections includes a conveyor having a plurality of hooks extended therefrom at spaced-apart positions thereon. A cutting member is positioned on the support structure of the apparatus with the conveyor being operative to advance each hook from a loading position, where it receives and supports a twisted casing section between a pair of links, to a cutting position, wherein the twisted casing section is moved into cutting engagement with the cutting member so as to be severed thereby. Each hook may be bifurcated to include a pair of legs defining an open ended slot for receipt of the cutting member therebetween at the cutting position for the hook. A guide structure may be provided in advance of the cutting position to properly align the hooks for receiving the cutting member and a pan may be positioned relative to the cutting member for receiving the severed links.

12 Claims, 9 Drawing Figures

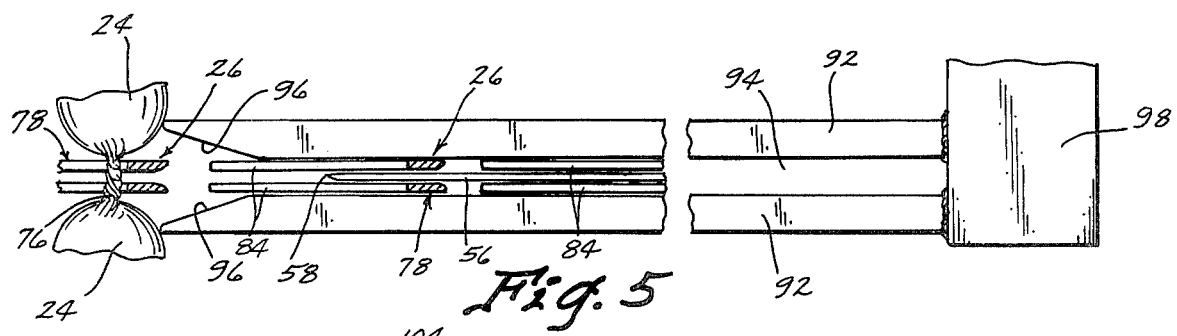
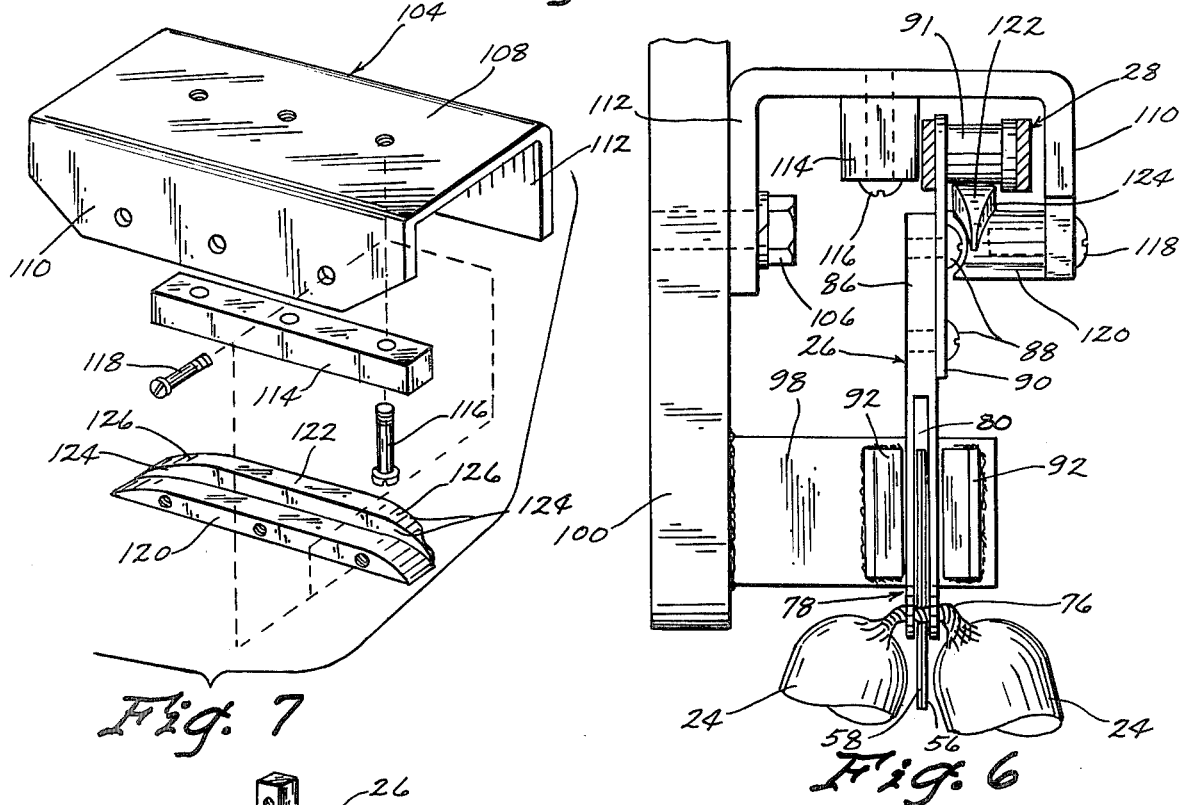
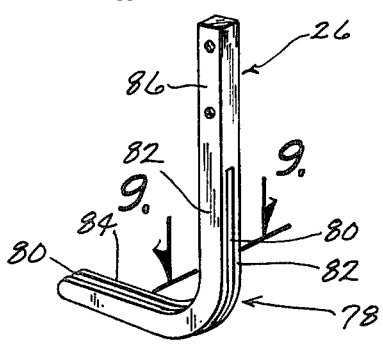
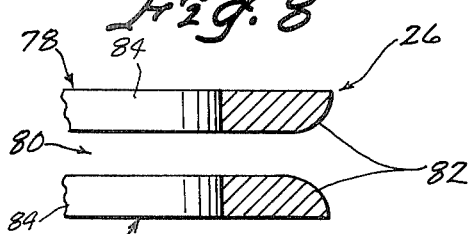

LINK CUTTER

BACKGROUND OF THE INVENTION

The present invention relates generally to an improvement for a machine for encasing a product such as sausage and the like, and more particularly to a link cutter apparatus including a conveyor for supporting loops of stuffed product casing and a cutting member for automatically separating the loops.

A loop supporting conveyor for stuffed product casing is disclosed in my prior U.S. Pat. No. 3,191,222 which issued on June 29, 1965. Whereas the looping conveyor disclosed in that patent represented a significant advance in the art, the present invention is directed to an improvement thereof. That patent shows a chain conveyor having a plurality of hooks thereon which are adapted to each sequentially receive a loop of stuffed and linked product casing as it is dispensed from a rotating horn. The loops of product casing were then removed from the hooks by thrusting a smoke stick through the loops and manually lifting several loops at a time from the hooks on the smoke stick. The loops conveyor of that patent did not include a means for cutting and separating the adjacent loops.

It is sometimes desirable to cut six, eight or some other predetermined nubmer of attached links in groups for packaging purposes. In other words, if a package of sausages is to have six in a package, it would be desirable to cut the links at every sixth sausage.

Accordingly, it is a primary object of the invention to provide an apparatus for cutting and separating lengths of stuffed product casing.

A further object is to provide a link cutter apparatus wherein lengths of stuffed product casing are supported on spaced-apart hooks which are advanced toward a cutting member for separating the adjacent lengths supported on each hook.

A further object of the invention is to provide a link cutter apparatus wherein the hooks are automatically aligned relative to the cutting member.

A further object is to provide a link cutter apparatus wherein a pan is provided for receiving and supporting the cut lengths of stuffed product casing, thereby to prevent untwisting of the adjacent links.

A further object is to provide a link cutter apparatus including a conveyor having a plurality of hooks adapted for coaction with a cutting member to cut a twisted casing section supported thereon.

Finally, it is an object to provide a link cutter apparatus which is durable in use, simple in construction and efficient in operation.

SUMMARY OF THE INVENTION

The link cutter apparatus of the present invention is adapted for separating lengths of stuffed product casing which each include a plurality of links interconnected by twisted casing sections. The apparatus includes a support structure and a conveyor thereon which includes a row of spaced-apart bifurcated hooks adapted for receiving a single length of stuffed product casing between adjacent hooks and conveying said lengths to a cutter member for automatically separating the lengths. The cutting member comprises a blade positioned for receipt between the legs of each bifurcated hook. The conveyor is advanced to move each hook from a loading position to a cutting position. In the loading position, the hook engages a twisted casing section between a pair of links of adjacent lengths so that the twisted casing section is supported on the legs of the hook and extended across the slot defined by said legs. In the cutting position, the legs of the hook are advanced past opposite sides of the cutting member so that the cutting member is received in the slot to cut the twisted casing section extended thereacross. A pan is positioned below the cutting member to receive and support the cut lengths of product casing so that the adjacent links thereof are not untwisted relative to one another. A guide structure is provided forwardly of the cutting member to vertically and laterally position the hooks for receiving the cutting member within the slots thereof.

BRIEF DESCRIPTION OF THE DRAWINGS

FIG. 5 is a top view, partly in section, as seen on line 5—5 in FIG. 2;

FIG. 6 is a partially sectional end view taken along line 6—6 in FIG. 2;

FIG. 7 is an exploded perspective of the slide track assembly for aligning and supporting the conveyor chain at the cutting position therefor;

FIG. 8 is an enlarged detail perspective view of a bifurcated hook of the invention; and FIG. 9 is an enlarged top sectional view taken along line 9—9 in FIG. 8.

DESCRIPTION OF THE PREFERRED EMBODIMENT

Figure 1:
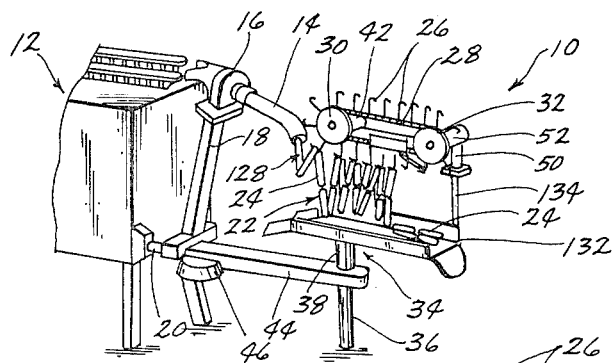
FIG. 1 is a diagrammatic view of the link cutter apparatus in assembly relation with a sausage encasing machine.

The link cutter apparatus 10 of the present invention is shown in FIG. 1 in assembly relation with a sausage encasing machine, indicated generally at 12. The machine 12 encases a relatively long length of a product such as sausage or the like, links the product casing, the loops the links by coveying them through a rotating helical conveyor tube or horn 14. The horn 14 is rotatably mounted on a gearbox 16 which is driven by a shaft within housing 18, that shaft being driven by output shaft 20 of machine 12. Each time the horn 14 completes a 360° rotation, it deposits one end of a loop 22 of links 24 onto one of the hooks 26 of a conveyor chain 28 which is trained about sprockets 30 and 32.

The support structure 34 for the link cutter 10 includes a leg 36 on which there is mounted a post 38 having a rotatable drive shaft 40 (FIG. 2) mounted therein. The shaft 40 is connected to a gearbox 42 for driving sprocket 30. Shaft 40, in turn, is driven by a chain (not shown) extended through a horizontal chain housing 44 to a transfer case 46 for rotation to the drive shaft 40 by the machine output shaft 20. It should be understood that the specific drive mechanism for sprocket 30 is not critical to the present invention. Rather, sprocket 30 may be driven by any convenient power source so long as it is timed in relation to the link forming machine so that the predetermined number of links may loop between successive hooks 26. A support arm 48 extends horizontally from post 38 for securement to an upright member 50 which supports an elongated collar 52 within which the idler shaft 54 for sprocket 32 is rotatably supported. The structure as thus far described is substantially as disclosed in my prior U.S. Pat. No. 3,191,222.

Figure 2:
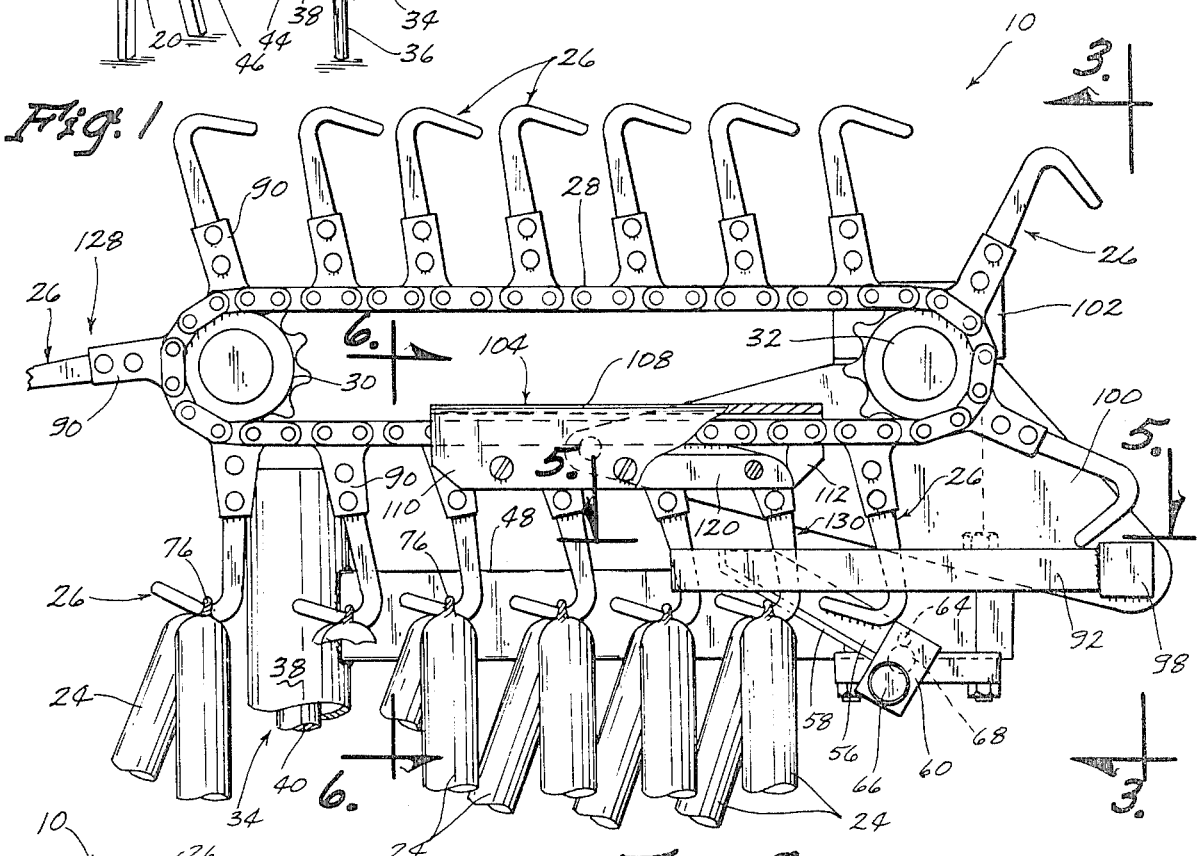
FIG. 2 is an enlarged side elevational view of the link cutter apparatus with portions broken away for clarity.
Figure 3:
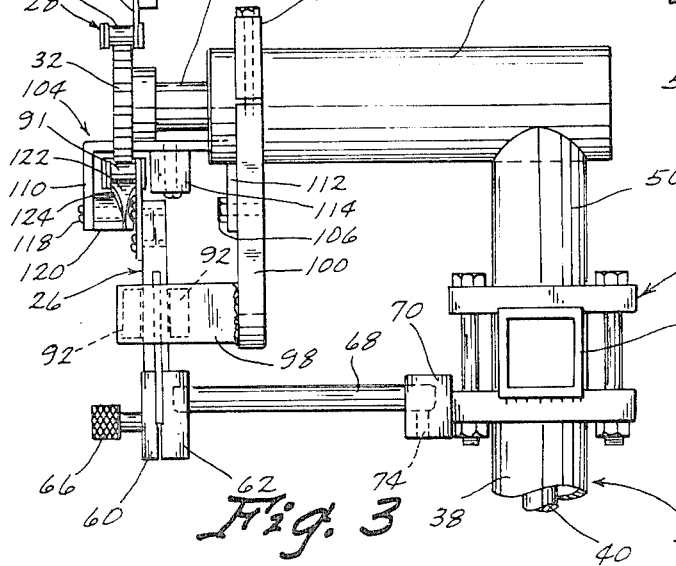
FIG. 3 is an end view taken along line 3—3 in FIG. 2.
Figure 4:
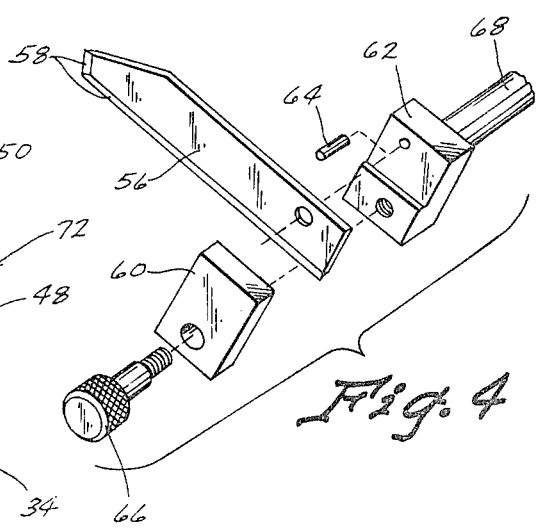
FIG. 4 is an exploded perspective view of the cutting member and support apparatus therefor.

Referring to FIGS. 2-4, the present invention further provides a cutting member 56 which is shown as a generally flat blade having a sharpened cutting edge 58. Cutting blade 56 is sandwiched between a pair of support blocks 60 and 62 and securely held therein by a dowel pin 64 and thumb screw 66. Support block 62 is secured to the end of a shaft 68, one end of which is adjustably secured within the lower clamp block 70 of a clamp fixture 72 secured into support arm 48. A set screw 74 fixes the axial position of shaft 68. In FIG. 2, it can be seen that the links 24 supported on each hook 26 are interconnected by a twisted casing section 76. Cutting blade 56 is operatively positioned for severing the twisted casing section 76 when the hooks are advanced to a cutting position as described in further detail below.

In FIGS. 3, 5 and 8, it is seen that each of the hooks 26 is bifurcated so as to include a pair of legs 78 which define an open ended slot 80 between them. The legs include generally parallel upright portions 82 and parallel hooked end portions 84. The upper shank 86 of each hook 26 is secured by a pair of screws 88 to flanged link 90 of chain 28. The slot 80 in each hook 26 is adapted to receive the cutting member 56 in the cutting position therefor.

To laterally align the hooks 26 with cutting member 56, a guide means is provided which includes a pair of lateral guide rails 92 which define a slot 94 between them for receiving the hooks 26 in close fitting relation. The rails include beveled end portions 96 for guiding the hooks into the slot 94. The opposite ends of the rails are secured to a support block 98 which is fixed to a guide frame 100 which is secured by a clamp bracket 102 onto collar 52.

The guide means further includes an inverted channel-shaped shroud 104 secured to guide frame 100 by bolts 106 (FIG. 6). Shroud 104 includes a generally horizontal top wall 108 interconnecting down-turned side flanges 110 and 112. A guide block 114 is secured to the underside of top wall 108 by bolts 116 for laterally confining the lower run of chain 28 between the guide block 114 and side flange 110. In addition, there is secured to side flange 110 by bolts 118 and elongated member 120 having an elevated slide track 122 thereon for engaging and supporting the underside of the lower run of chain 28 adjacent the cutting position for hooks 26. Referring to FIGS. 6 and 7, it can be seen that both ends of slide track 122 are tapered as at 124 and rounded as at 126 to facilitate guiding the chain 28 onto and off from the slide track. Accordingly, it is evident in FIG. 6 that when the hooks 26 approach their cutting positions adjacent cutting member 56, they are both vertically and laterally restrained for precise alignment of the slot 80 with the cutting member 56.

In operation, the sausage encasing machine 12 is operated to discharge linked sausages from the rotating horn 14. The conveyor chain 28 of the link cutter apparatus 10 is timed relative to the sausage encasing machine so that successive hooks 26 are positioned to receive successive loops 22 from the horn 14 each revolution thereof. Note that the number of links 24 per loop 22 is determined by the relative speed of conveyor chain 28. By adjusting the speed, more or less links 24 are hung on the hooks 26.

Conveyor chain 28 advances the hooks from a loading position to a cutting position. In the loading position, each hook 26 is extended generally laterally from sprocket 30 as indicated at 128 for receiving and supporting thereon a twisted casing section 76 between a pair of adjacent links 24. Note that in the embodiment shown, the twisted casing section 76 is supported on both legs 78 and extends across slots 80. The hooks 26 are advanced with the lower run of chain 28 through shroud 104 where the chain links 90 are slidably engaged on slide track 122. As chain 28 is advanced further toward cutting member 56, the hooks 26 are laterally engaged within the slot 94 defined by guide rails 92. Upon further advancement to a cutting position indicated at 130 in FIG. 2, the cutting blade 56 is received within the slot 80 in cutting engagement with the twisted casing section 76, thereby severing the same as the hooks 26 are advanced past the cutting position.

The severed lengths of sausage links fall onto a pan 132 which is adapted to support each separate link 24 so as to prevent the untwisting of adjacent links. Pan 132 may be supported on post 38 at one end and by a hanger member 134 (FIG. 1) at the other end.

Whereas a preferred embodiment of the invention has been shown and described herein, it is to be understood that many modifications and variations may be made which come within the broad scope of the appended claims. For example, the shape of hooks 26 may be modified so long as the twisted casing sections 76 are operatively supported in cutting engagement with a cutting member. Likewise, it may be desirable to provide a movable cutting member in place of the stationary blade shown.

I claim:

1. An apparatus for separating stuffed product casing links interconnected by twisted casing sections, comprising, a support means, a conveyor on said support means, said conveyor including a plurality of hooks extended therefrom
   at spaced-apart positions thereon, a cutting member on said support means, said conveyor being operative to advance each hook from a loading
   position, wherein said hook is adapted to receive and support a twisted casing section between a pair of links, to a cutting position wherein a twisted casing section supported thereon is moved into cutting engagement with said cutting member so as to be severed thereby.

2. The apparatus of claim 1 further comprising a pan means operatively positioned relative to said cutting member for receiving and supporting the severed links.

3. The apparatus of claim 1 wherein each hook is bifurcated so as to include a pair of legs defining an open ended slot therebetween whereby a twisted casing section is supported on said legs and extended across said slot at the loading position for said hook.

4. The apparatus of claim 3 wherein, in the cutting position for each hook, the leg thereof are advanced past opposite sides of said cutting member such that said cutting member is received in said slot to cut the twisted casing section extended thereacross.

5. The apparatus of claim 4 wherein said cutting member comprises a generally flat blade having a sharpened cutting edge thereon.

6. The apparatus of claim 5 wherein said blade is stationarily supported with the cutting edge thereof inclined rearwardly and upwardly with respect to the direction of travel of a hook moving from the loading position to the cutting position therefor.

7. The apparatus of claim 3 wherein the legs of each bifurcated hook include generally parallel hooked end portions.

8. The apparatus of claim 4 further comprising guide means positioned on said support means to align the hooks for receiving said cutting member in the slot thereof.

9. The apparatus of claim 8 wherein said endless conveyor comprises a chain trained about a pair of sprockets, said hooks being secured to said chain for movement therewith.

10. The apparatus of claim 9 wherein said guide means includes an elongated slide track positioned on said support means for engaging and supporting the underside of said chain at the cutting positions of said hooks.

11. The apparatus of claim 8 wherein said guide means includes a pair of lateral guide rails defining a slot therebetween for receiving said hooks in close fitting relation therebetween.

12. The apparatus of claim 11 wherein said lateral guide rails include beveled end portions for guiding said hooks into said slot.

* * * * *